United States Patent [19]

Milo

[11] Patent Number: 4,460,013

[45] Date of Patent: Jul. 17, 1984

[54] PRESSURE-VACUUM VENT

[75] Inventor: August Milo, Elizabeth, N.J.

[73] Assignee: Universal Valve Co., Inc., Elizabeth, N.J.

[21] Appl. No.: 331,527

[22] Filed: Dec. 17, 1981

[51] Int. Cl.³ ............................................. F16K 17/18
[52] U.S. Cl. .................................. 137/493.4; 137/532
[58] Field of Search ............................... 137/493.4, 532

[56] References Cited

U.S. PATENT DOCUMENTS

| | | | |
|---|---|---|---|
| 433,618 | 8/1890 | Cunningham | 137/493.4 |
| 1,151,449 | 8/1915 | Durfee | 137/532 |
| 1,666,935 | 4/1928 | Howell | 137/493.4 |
| 2,369,018 | 2/1945 | Cavicchioli | 137/493.4 |
| 2,986,308 | 5/1961 | Pacey et al. | 137/493.4 |
| 3,454,040 | 7/1969 | Dunkelis | 137/493.4 |
| 3,699,999 | 10/1972 | Dunkelis | 137/493.4 |
| 4,212,315 | 7/1980 | Fahl et al. | 137/493.4 |

OTHER PUBLICATIONS

Universal Valve Company Catalog, Copyright 1976, Item No. 46, p. 7.
Universal Valve Company, Drawing Part No. "46-2", Dec. 1975.

Primary Examiner—Martin P. Schwadron
Assistant Examiner—John A. Rivell
Attorney, Agent, or Firm—Karl L. Spivak

[57] ABSTRACT

The pressure-vacuum vent is adapted to communicate an internal storage chamber with atmosphere at predetermined pressure and vacuum conditions. The vent includes a poppet valve member that moves upwardly within a body to vent the chamber to atmosphere when the pressure build up in the chamber reaches a predetermined level. A non-deforming mass is supported on the upper wall of the valve member for preventing the member from moving upwardly until the predetermined pressure build up in the storage chamber is reached. A hood assembly overfits the body and includes external and internal hoods. The internal hood is contained within the upper open end of the vent and includes an internal cavity facing upwardly to receive rain and other foreign matter. The external hood includes a sidewall that flares outwardly from an upper opening in vertical alignment with the cavity in the internal hood to a lower end overlying the sidewall of the vent body. The flared sidewall of the external hood is spaced outwardly from the internal hood to provide an unrestricted vertical passage for upward vapor discharge.

5 Claims, 4 Drawing Figures

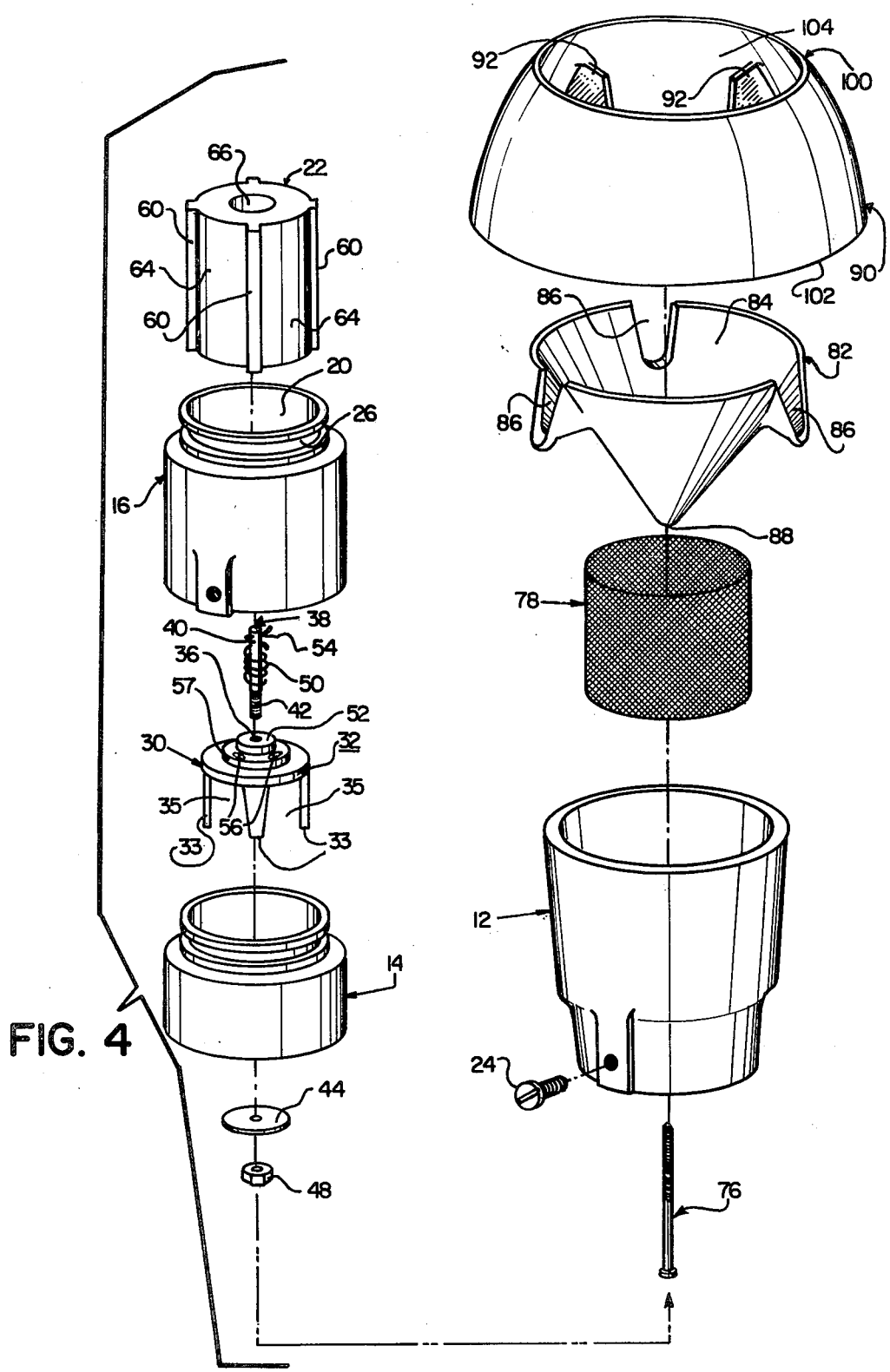

PRESSURE-VACUUM VENT

BACKGROUND OF THE INVENTION

The present invention relates generally to the field of venting devices, and more particularly to a unique pressure-vacuum vent adapted to communicate an internal storage chamber with atmosphere under predetermined pressure or vacuum conditions within the chamber. The vent of this invention is particularly well suited for use with underground storage tanks or containers, such as those employed to store gasoline or other flammable liquids.

In underground gasoline storage tanks it is extremely important to provide a system for venting the internal chamber thereof to atmosphere when pressure or vacuum conditions reach or exceed predetermined levels. For example, when the tank is being filled it is necessary to provide a vent through which vapors can escape to prevent an undesirably high pressure build up within the chamber. Durng dispensing of gasoline from the tank, it is necessary to communicate the internal chamber with atmosphere to prevent the build up of an undesired vacuum level therein.

A typical prior art pressure-vacuum vent used with a gasoline storage tank employs a pair of coil springs in conjunction with a poppet valve member and a sealing disk to control the pressure and vacuum venting operations (hereinafter sometimes referred to as "pressure opening" or "vacuum opening" of the vent). For example, the No. 46 pressure-vacuum vent sold by Universal Valve Co. of Elizabeth, N.J. included such a two-spring arrangement. However, the coil spring employed to control the pressure opening of the poppet valve member did not operate as reliably as desired. In particular, changes in temperature conditions caused related changes in spring tension which, in turn, caused uncontrolled variations in the pressure level at which the poppet valve member opened to communicate the storage chamber with atmosphere. Moreover the corrosive environment in which the vent operated often caused a loss of spring life, thereby further contributing to uncontrolled operation of the poppet valve member. The problems associated with changes in spring tension and loss of spring life are more pronounced in the relatively large coil spring employed to control the pressure opening of the valve, than in the much smaller spring employed to control the vacuum opening of the vent. Therefore a significant benefit would be achieved if the spring employed to control the pressure opening of the vent could be replaced by a more reliable system.

A further problem encountered in prior art devices relates to protecting the interior of the vent from freeze-ups, rain and other foreign matter. This protection needs to be achieved without interfering with, or unduly restricting the upward escape of gasoline vapors. This is important to provide effective venting when a predetermined pressure condition within the storage tank is reached, or exceeded, without causing excessive exposure to these vapors at ground level. In U.S. Pat. No. 4,147,096, issued to Caswell, the upward escape of vapors during the venting operation is somewhat impeded by the baffled arrangement disclosed therein. In particular the vapors are required to change flow direction several times during the venting operation.

Although prior art pressure-vacuum vents have proven to be adequate for many applications, problems have been encountered in controlling the pressure and vacuum opening operations, and also in protecting the vent from inclement weather conditions without impeding the upward venting of vapors therefrom. It is to the resolution of the these deficiencies that the instant invention is directed.

SUMMARY OF THE INVENTION

The pressure-vacuum vent of this invention is adapted to communicate an internal storage chamber, such as the chamber associated with an underground gasoline storage tank, with atmosphere under predetermined pressure or vacuum conditions within the chamber. The vent includes a poppet valve member having first passage means through an upper wall thereof for communicating the storage chamber with atmosphere at a predetermined vacuum level within the chamber, and second passage means for venting the storage chamber to atmosphere at a predetermined pressure level within the chamber. A movable seal member, generally in the form of a spring loaded disk member, is normally biased to prevent communication of the first passage means with atmosphere until the predetermined vacuum level is reached. In accordance with one improved aspect of the this invention, a non-deforming mass is supported on the upper wall of the poppet valve member for preventing upward movement of this member until a predetermined pressure build up in the storage chamber is reached. Thereafter the poppet valve member will move upwardly against the opposing downward force of the non-deforming mass to vent the storage chamber to atmosphere through the second passage means.

Reference throughout this application, including the claims, to the mass being "non-deforming" is defined to mean that deformation, such as is relied upon, or required when a spring is utilized to transmit a force, is not relied upon to control the pressure opening of the poppet valve member. In this invention the mass of the non-deforming member is relied upon to establish the opposing force that needs to be overcome during the pressure opening operaton of the vent.

In the preferred form of this invention, radially extending fins are spaced circumferentially about the periphery of the non-deforming mass to form channels between them. These channels assist in communicating the interior storage chamber of the tank with atmosphere when the poppet valve member moves upwardly in response to the build up of a predetermined pressure within said chamber. Most preferably the radially extending fins are disposed close to internal sidewalls of the compartment in which the mass is retained to assist in maintaining the mass in its required, or proper orientation. A central passage is provided in the mass for receiving the stem and biasing spring associated with the vacuum-sealing disk of the vent. In the most preferred embodiment, the upper wall of the poppet valve member includes a central hub section which is received within a counter-bored region of the central passage in the non-deforming mass to also assist in maintaining the mass in its required orientation.

In accordance with an additional aspect of this invention, a hood assembly includes an inner hood retained within the upper open end of the vent body. This inner hood is of a conventional construction having an internal cavity, or compartment opening upwardly for receiving rain, snow and/or other foreign debris (collectively "foreign matter") to prevent such foreign matter from entering the vent and interfering with its proper operation. Such an internal hood has been included as part of the prior art No. 46 pressure-vacuum vent referred to earlier in this application.

A unique aspect of the hood assembly in accordance with this invention resides in an external hood positioned over the internal hood, and having a sidewall that flares outwardly in a direction from an upper open end to a lower end thereof. The opening at the upper end is in vertical alignment with the opening into the internal cavity of the inner hood, and the lower end overlies the sidewall of the vent body. Foreign matter entering the upper open end of the external hood first will be directed into the internal cavity of the inner hood. Thereafter, as the cavity fills, spouts associated with the upper end thereof will direct the flow of foreign matter away from the interior of the vent. Since the sidewall of the external hood overlies the vent body it will protect the interior of the vent from driving rain, snow, sleet and other foreign matter. The flared configuration of the sidewall provides a relatively wide and unrestricted passage between the external hood and the internal hood to permit unrestricted upward vertical escape of gasoline vapors during the venting operation. This is a distinct improvement over the Caswell arrangement described earlier, which requires the vapors to follow a labyrinth path in order to vent to atmosphere. In addition, the unrestricted passage established between the external and internal hoods permits unimpeded downward flow of foreign matter directed through the spouts associated with the internal cavity of the internal hood.

Other objects and a fuller understanding of the invention will be had by referring to the following description and claims of a preferred embodiment thereof, taken in conjunction with the accompanying drawings, wherein like reference characters refer to similar parts throughout the several views.

BRIEF DESCRIPTION OF THE DRAWINGS

FIG. 4 is an exploded, isometric view of the pressure-vacuum vent of this invention.

DESCRIPTION OF THE PREFERRED EMBODIMENT OF THE INVENTION

Figure 1:
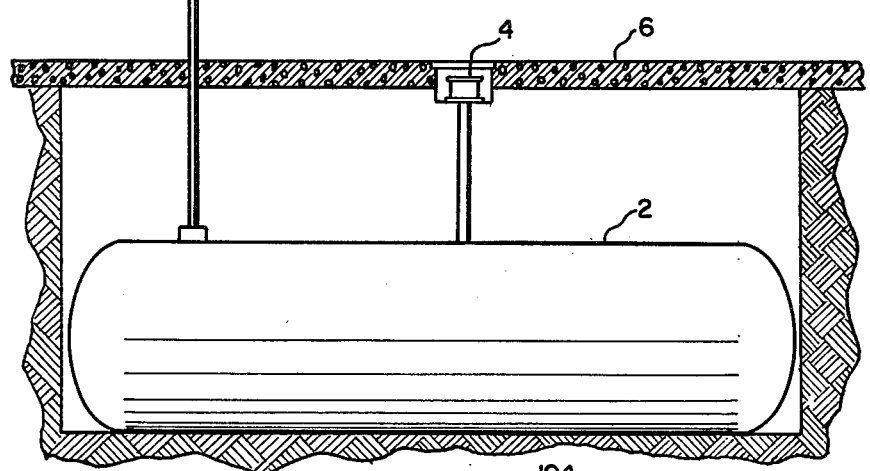
FIG. 1 is a side elevational view showing a subsurface gasoline storage tank, and in particular, the arrangement of a tank vent line in connection with which the pressure-vacuum vent of the instant invention most desirably is employed.

Although specific terms are used in the following description for the sake of clarity, these terms are intended to refer only to the particular structure of the invention selected for illustration in the drawings, and are not intended to define or limit the scope of the invention.

Referring now to the drawings, and in particular to FIG. 1, the present invention is particularly well suited for use in connection with underground storage facilities, such as a gasoline storage tank 2. The tank includes a conventional fill port 4 which is accessible at ground level 6, and a vent line or conduit 8 that extends above ground level to communicate the internal compartment of the tank with atmosphere through a pressure-vacuum vent 10.

Figure 2:
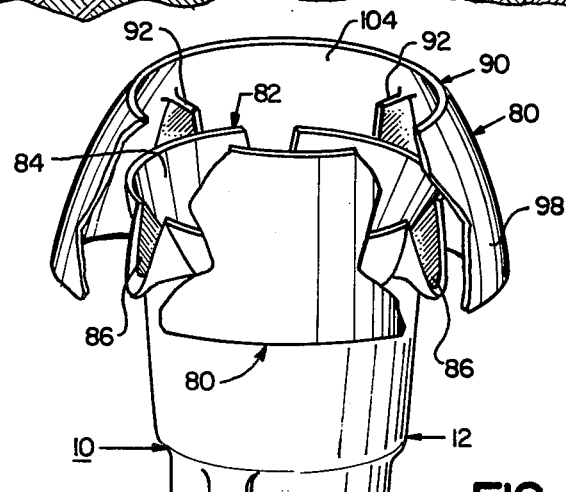
FIG. 2 is an enlarged, perspective view of the pressure-vacuum vent of this invention with parts broken away to show details of interior construction.
Figure 3:
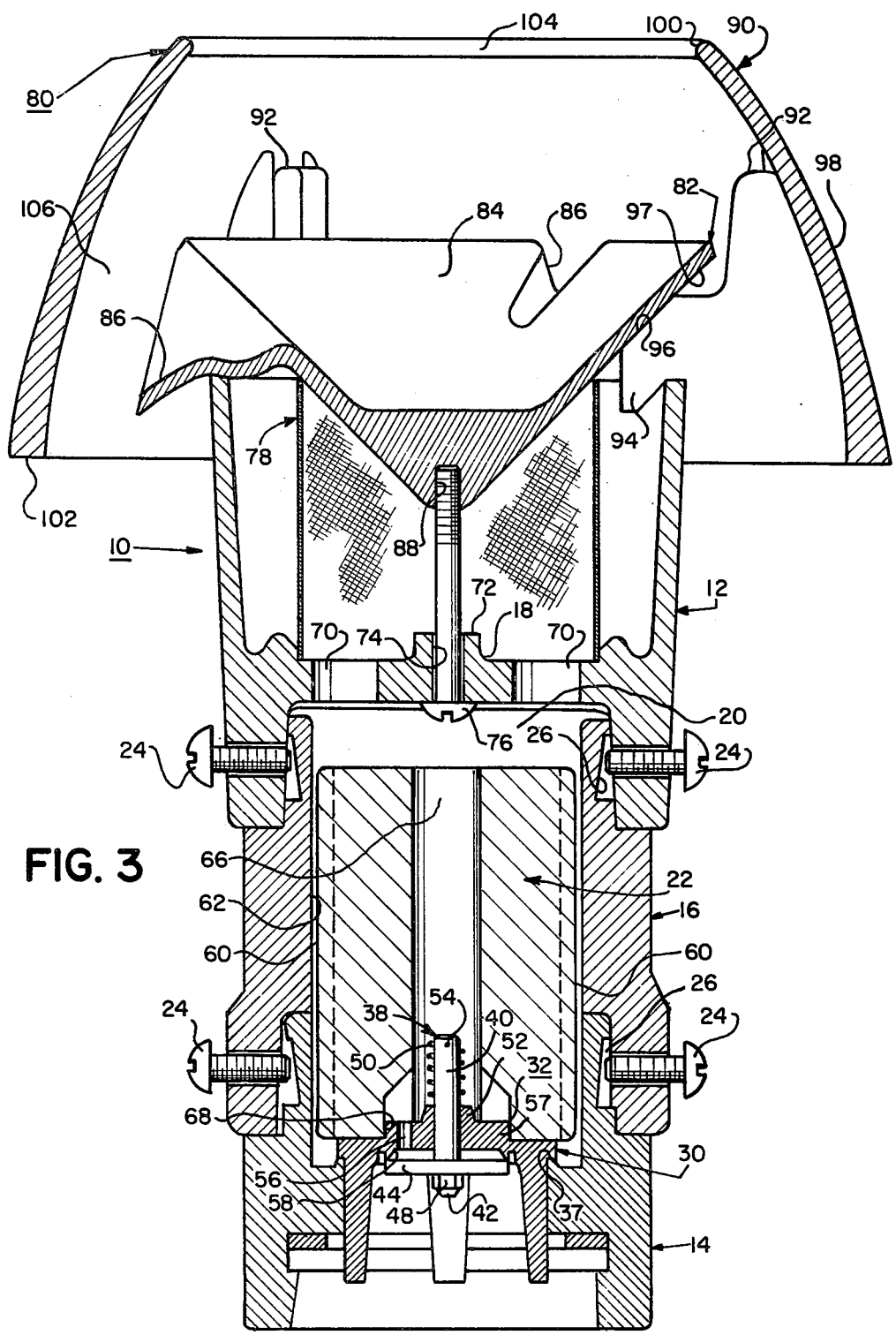
FIG. 3 is an enlarged vertical sectional view through the pressure-vacuum vent of this invention.

Referring specifically to FIGS. 2-4, the pressure-vacuum vent 10 of this invention is adapted to communicate the interior chamber of the storage tank 2 with atmosphere when either the pressure or vacuum level within the chamber exceeds a predetermined valve. Although the particular pressure or vacuum level at which the vent is intended to operate can be varied, the vent commonly is set to pressure open at approximately 8 ounces of internal pressure within the chamber, and to vacuum open at approximately ½ ounce of vacuum.

The vent 10 includes a main body 12 and sleeve 14, both of which are made of aluminum, or other suitable non-corrosive material. The prior art No. 46 pressure-vacuum vent manufactured by Universal Valve Company Inc., and referred to earlier in this application, also included the main body 12 and sleeve 14. However, in this invention a body extension 16 is added, and this extension cooperates with the bottom wall 18 of the main body 12 (FIG. 3) to form an enlarged compartment 20 for receiving a non-deforming mass 22. The precise structure and operation of this mass will be described later.

The main body 12 is interconnected to the body extension 16 through the cooperation of threaded screw members 24 at the lower end of the main body 12 with a circumfertential recess 26 adjacent the upper edge of the body extension 16. In a like manner the body extension 16 is interconnected with the sleeve 14.

Referring particularly to FIGS. 3 and 4, the vent 10 includes a poppet assembly 30 for communicating the internal chamber of the gasoline storage tank with atmosphere at the desired pressure or vacuum level within said chamber. The poppet assembly 30 includes a poppet valve member 32 having an upper wall with a central passage 36 therethrough. In addition, the valve member 32 includes downwardly extending, circumferentially spaced apart legs 33 providing venting passageways 35 therebetween. The valve member, when in its non-venting position, rests on the valve seat 37 (FIG. 3).

A brass stud 38 extends through the passage 36 and includes a main body section 40, and a reduced diameter, threaded, lower stem section 42. A brass seal disk 44 includes a central passage therein for receiving the lower threaded stem section 42 of the stud. A threaded nut 48 cooperates with the threaded stem section 42 to maintain the seal disk 44 in proper position for providing its desired vent sealing and opening operations under the required vacuum conditions within the storage tank 2.

As can be seen best in FIGS. 3 and 4, a coil spring 50 is disposed around the stud 38 and is biased between the central hub section 52 of the poppet valve member 32 and a radially projecting cotter pin 54 located in the stud 38. The coil spring 50 can be made of any suitable material, and, is designed to vacuum open at a level of ½ ounce.

As can be seen best in FIG. 4 a plurality of elongate openings 56 extend through the hub section 57, concentric with the hub section 52. Three such openings are actually provided in the preferred embodiment of the invention. However, the number of such openings can be varied as desired, or required. Note that the coil spring 50 normally biases the seal disk 44 into engagement with a circumferential surface 58 (FIG. 3) that constitutes a valve seat for preventing the flow of air from atmosphere into the gasoline storage tank 2.

Referring specifically to FIGS. 3 and 4, the non-deforming mass 22 forming a very significant part of this invention will now be described in detail. This mass integrally includes a plurality of radially extending fins, or ribs 60 spaced circumferentially about the periphery and dimensioned to be located close to the inner surface 62 of the elongate compartment 20. This assists in maintaining the required position and orientation of the mass 22 relative to the other components of the vent. The ribs or fins 60 define elongate channels 64 between them to provide passageways for assisting in communicating the internal chamber of the storage tank with atmosphere when the poppet valve member 32 is moved in response to the build up of a high pressure condition within the tank, as will be described in greater detail hereinafter.

The mass 22 is provided with a central passage 66 into which the stud 38 supporting the seal disk 44 extends. The passage 66 is counter-bored adjacent its lower end to provide an enlarged region 68 adapted to seat about the hub section 57. This further aids in maintaining the desired orientation of the mass 22 relative to the poppet valve member 32. Most preferably, the depth of the counter-bored region 68 is slightly greater than the height of hub section 57 to assist in communicating the internal chamber of the tank 2 with atmosphere, through openings 56 in said hub section, when the seal disk 44 is pulled in a downward direction in response to the build up of an undesirable vacuum level within said chamber.

In order to aid in establishing communication between the compartment 20, in which the mass 22 is disposed and atmosphere, the bottom wall 18 of the main body 12 is provided with two substantially hemispherical passages 70. The passages 70 are divided by a central rib section 72 and a passageway 74 extends through the rib section for receiving a threaded screw 76. This screw extends into the central region of an annular screen member 78 to assist in retaining a protective hood assembly 80 in proper position relative to the body section of the vent 10, as will be described in greater detail hereinafter. It should be noted that the annular screen 78 is positioned to overlie the hemispherical passages 70 to prevent any foreign material entering the main body of the vent 10 from being carried through the vent and possibly clogging the various flow lines or movable valve members. The construction of the main body 12 and screen 78 can be substantially the same as in the prior art No. 46 pressure-vacuum vent described earlier in this application.

Referring specifically to FIGS. 2–4, a hood assembly 80 is provided to protect the interior of the vent 10 against the entrance of foreign matter. This assembly includes an inner hood 82 made of aluminum, or similar non-corrosive material. A central cavity or compartment 84 of this hood overlies the opening into the vent and is designed to capture foreign matter that otherwise would enter the vent. The upper end of the cavity 84 communicates with a plurality of spouts 86 that direct foreign matter away from of the interior region of the vent when the cavity fills up. The screw 76 is secured into the threaded opening 88 located in the base or bottom of the inner hood 82 to retain the hood in its desired position overlying the central passage through the screen 78.

The arrangement of the inner hood 82 and the manner in which it is retained in engagement with the upper surface of the screen 78 has been employed in the earlier-described prior art vent. However, in accordance with this invention, a unique cooperative relationship is established between the inner hood 82 and an external hood 90. In particular, the external hood 90 includes a plurality of circumferentially spaced locating and retaining members 92, each of which is provided with a downwardly directed lip 94 (only one being shown in FIG. 3) for overlying the upper edge of the main body 12. The lip 94 of each of the members 92 is secured in this position by engaging the sloping upper surface 96 thereof with the outer conical surface 97 of the inner hood 82.

As can be seen best in FIG. 3, the external hood is provided with a generally curved sidewall 98 that flares outwardly in a direction from its upper edge 100 to its lower edge 102. The upper edge 100 defines a central passage or opening 104 that is in vertical alignment with the central cavity, or compartment 84 of the internal hood 82. In this manner any rain or other foreign matter that enters the external hood 90 through the central opening 104 initially will be caught, and collected in the central cavity 84 of the internal hood 82. When the cavity fills up, the foreign matter will be directed away from the interior region of the vent 10 by the spouts 86. The lower edge 102 of the external hood 90 extends below the upper edge or surface of the main body 12 to thereby overlie the side of the main body and prevent foreign matter from being directed into the interior region of the vent from the side thereof.

Of particular significance in the construction of the hood assembly 80 is the relatively large, vertically unrestricted passage 106 (FIG. 3) established between the external hood 90 and the internal hood 82. This provides a direct, vertically upward unrestricted flow path for the venting of vapors. The vapors are not forced downwardly to expose individuals that might be near the vent 10 to the noxious fumes emitted from the tank.

The operation of vent 10 will now be described.

When the gasoline storage tank 2 is being filled through line 4, it will be necessary to vent the gasoline vapors to prevent an excessive pressure build up in said tank. When the internal pressure within the tank reaches a predetermined level to overcome the downward pressure established by the lead mass 22, the poppet valve member 32 will be lifted upwardly out of its sealing engagement with valve seat 37. The venting passages 35 between the downwardly projecting legs 33 of the valve member will then communicate the interior chamber of the storage tank 2 with atmosphere through the elongate passages 64 provided between the fins 60, the hemispherical passages 70 provided in the bottom wall 18 of the main body 12, the porous wall of the screen 78 and the vertically unrestricted passageway 106 between the internal and external hoods 82 and 90.

As gasoline is being pumped or removed from the storage tank 2, a partial vacuum tends to be created within the internal chamber thereof. In order to prevent this partial vacuum from building up to a level that might interfere with the dispensing operation, the vent 10 is designed to open and vent the chamber to atmosphere at a predetermined vacuum level. This level is determined by the rating of the coil spring 50 employed to control the operation of the brass seal disk 44. When the desired vacuum level is exceeded, the seal disk 44 will be pulled in a downward direction, as viewed in FIG. 3, to provide direct communication of the internal chamber of the storage tank 2 with the openings 56 provided through the hub section 57. The openings 56 communicate the internal compartment of the storage tank 2 with atmosphere through the central passage 66 of the lead mass 22, the hemispherical passages 70 in the bottom wall 18 of the main body 12, the porous sidewall of the screen 78 and the vertically unrestricted passageway 106 between the internal hood 80 and the external hood 90.

Since a non-deforming mass is employed to control the pressure opening of the vent, reliance on a spring member for this purpose is not required. Accordingly the vent 10 of this invention is not subjected to variations in its pressure opening operation due to factors which otherwise effect the operation of spring members, such as changes in temperature and loss of spring life. In the instant invention only the weight of mass 22 is relied upon to control the pressure opening of the vent. The weight of this mass is not adversely affected by temperature changes, and clearly spring life plays absolutely no part in its operation.

The arrangement of the internal hood 82 and external hood 90 to provide the relatively large unrestricted passageway 106 provides for the reliable upward venting of vapors, as is required. This is a distinct advantage over the prior art constructions requiring the vapors to follow a labyrinth path to vent from the system.

Although the invention has been described with a certain degree of particularly it is understood that the present disclosure has been made only by way of example and that numerous changes in the details of construction and the combination and arrangement of parts may be resorted to without departing from the spirit and scope of the invention.

What is claimed is:

1. A vent adapted to communicate an internal storage chamber with atmosphere under predetermined pressure and vacuum conditions within said chamber, said vent comprising:
    a hollow, generally cylindrical body, the body downwardly defining a seat:
    a poppet valve member within the body and resting upon the seat, the poppet valve member including first passage means in an upper wall thereof for communicating the storage chamber with atmosphere through the body at a predetermined vacuum level within said chamber;
    second passsage means above the poppet valve member for venting the storage chamber to atmosphere through the body at a predetermined pressure level within said chamber, the outer periphery of the second passage means being defined by the body;
    a movable seal member for said first passage means biased to prevent communication of said first passage means with atmosphere until said predetermined vacuum level within the chamber is reached; and
    a non-deforming mass movably supported within the second passage means on the upper wall of the poppet valve member to urge the poppet valve member upon the seat for preventing the member from moving upwardly until the predetermined pressure build up in the storage chamber is reached, upward movement of said poppet valve member being adapted to vent the storage chamber to atmosphere through said second passage means.

2. The vent of claim 1 wherein said mass includes a longitudinal, central passage and radially extending fins about the periphery thereof, the fins being spaced circumferentially from each other to form channels therebetween, said channels and said central passage forming portions of the second passage means to assist in communicating the internal storage chamber with atmosphere when the poppet valve member is caused to move upwardly against the weight of said mass in response to a predetermined pressure build up in said chamber.

3. The vent of claim 2 wherein the radially extending fins are disposed close to internal sidewalls of the hollow body to thereby assist in maintaining the desired orientation of said mass within said body.

4. The vent of claim 3 wherein said movable seal member includes a disk joined to a vertical stem that extends through an opening in an upper wall of the poppet valve member, the said stem extending into the central passage of the mass and being longitudinally movable therein without support.

5. The vent of claim 4 wherein the upper wall of the poppet valve member includes a hub section, and wherein the central passage in the mass is counter-bored to provide an enlarged opening in which the hub section is received for assisting in maintaining the desired orientation of the mass.

* * * * *